(12) United States Patent
Kline et al.

(10) Patent No.: US 8,796,636 B2
(45) Date of Patent: Aug. 5, 2014

(54) NEUTRON DETECTOR HAVING ENHANCED ABSORPTION AND BIFURCATED DETECTION ELEMENTS

(75) Inventors: Craig R. Kline, Linton, IN (US); Herschel Ellis Workman, Bloomington, IN (US)

(73) Assignee: PartTec, Ltd., Bloomington, IN (US)

( * ) Notice: Subject to any disclaimer, the term of this patent is extended or adjusted under 35 U.S.C. 154(b) by 993 days.

(21) Appl. No.: 12/880,505

(22) Filed: Sep. 13, 2010

(65) Prior Publication Data
US 2012/0061580 A1 Mar. 15, 2012

(51) Int. Cl.
*G01T 3/06* (2006.01)
(52) U.S. Cl.
CPC ........................................ *G01T 3/06* (2013.01)
USPC .................................................... 250/390.11
(58) Field of Classification Search
CPC .......................................................... G01T 3/06
USPC ............................................ 250/390.11, 391
See application file for complete search history.

(56) References Cited

U.S. PATENT DOCUMENTS

| | | | |
|---|---|---|---|
| 3,398,278 A | 8/1968 | Splichal, Jr. et al. |
| 5,029,262 A | 7/1991 | Schulte |
| 5,036,202 A | 7/1991 | Schulte |
| 5,231,290 A | 7/1993 | Czirr et al. |
| 5,345,084 A | 9/1994 | Byrd |
| 5,591,967 A | 1/1997 | Moake |
| 5,659,177 A | 8/1997 | Schulte et al. |
| 5,680,423 A | 10/1997 | Perkins et al. |
| 5,880,469 A | 3/1999 | Miller |
| 5,940,460 A | 8/1999 | Seidel et al. |
| 6,078,052 A | 6/2000 | DiFilippo |
| 6,362,485 B1 | 3/2002 | Joyce et al. |
| 6,495,837 B2 | 12/2002 | Olsher et al. |
| 6,529,573 B2 | 3/2003 | Olsher et al. |
| 6,566,657 B2 | 5/2003 | Odom et al. |
| 6,639,210 B2 | 10/2003 | Odom et al. |
| 6,909,098 B2 | 6/2005 | Bross et al. |
| 6,924,487 B2 | 8/2005 | Bolozdyna et al. |
| 6,927,398 B2 | 8/2005 | Katagiri |

(Continued)

FOREIGN PATENT DOCUMENTS

JP 5134049 5/1993
WO 2010099334 9/2010

OTHER PUBLICATIONS http://ortec-online.com/Solutions/homeland-security.aspx. Last visited Jan. 21, 2011.

(Continued)

*Primary Examiner* — David Porta
*Assistant Examiner* — Faye Boosalis
(74) *Attorney, Agent, or Firm* — McConnell IP Law

(57) ABSTRACT

A neutron detection system includes a neutron scintillator having a thickness greater than an optimal thickness and less than twice the optimal thickness. The system includes a first layer of wavelength shifting fiber optic elements positioned on a first side of the neutron scintillator. Adjacent fibers of the first layer pass light to distinct photo-multiplication devices. The system further includes a second layer of wavelength shifting fiber optic elements positioned on a second side of the neutron scintillator. Adjacent fibers of the second layer pass light to distinct photo-multiplication devices. The two layers may share photo-multiplication devices or use different sets of photo-multiplication devices. The system includes a controller that distinguishes a neutron radiation event from a gamma radiation event in response to electronic signals from the distinct photo-multiplication devices.

41 Claims, 8 Drawing Sheets

(56) References Cited

U.S. PATENT DOCUMENTS

| | | |
|---|---|---|
| 6,989,541 B2 | 1/2006 | Penn |
| 7,026,627 B2 | 4/2006 | Fowler, Jr. et al. |
| 7,141,799 B1 | 11/2006 | Neal et al. |
| 7,244,947 B2 | 7/2007 | Polichar et al. |
| 7,288,771 B2 | 10/2007 | Neal et al. |
| 7,326,933 B2 | 2/2008 | Katagiri et al. |
| 7,351,982 B2 | 4/2008 | Hofstetter et al. |
| 7,372,040 B2 | 5/2008 | Policher et al. |
| 7,501,077 B1 | 3/2009 | Hodges et al. |
| 7,514,694 B2 | 4/2009 | Stephan et al. |
| 7,521,686 B2 | 4/2009 | Stuenkel et al. |
| 7,525,101 B2 | 4/2009 | Grodzins |
| 7,626,178 B2 | 12/2009 | Ivan et al. |
| 7,667,206 B1 | 2/2010 | Hindi et al. |
| 7,679,064 B2 | 3/2010 | Katagiri |
| 7,696,486 B2 | 4/2010 | Dangendorf et al. |
| 7,723,691 B2 | 5/2010 | Tonami |
| 2005/0258372 A1 | 11/2005 | McGregor et al. |
| 2007/0272874 A1 | 11/2007 | Grodzins |
| 2009/0302231 A1 | 12/2009 | McGregor et al. |
| 2010/0226580 A1 | 9/2010 | Frank |

OTHER PUBLICATIONS http://www.analytical-online.com/Products/Analytical_instru/ortecneutron.html. Last visited Jan. 21, 2011.
http://www.rtftechnologies.org/physics/fusor-mark3-neutron-detector.htm. Last visited Jan. 21, 2011.
http://www.canberra.com/products/1150.asp. Last visited Jan. 21, 2011.
International Search Report and Written Opinion, ISA/US, PCT/US2011/051426, PARTTEC, Ltd., Jan. 9, 2012.
International Search Report and Written Opinion, ISA/US, PCT/US2011/051429, PARTTEC, Ltd., Jan. 10, 2012.
English language abstract of JP5134049A, Sato et al., May 28, 1993.

NEUTRON DETECTOR HAVING ENHANCED ABSORPTION AND BIFURCATED DETECTION ELEMENTS

BACKGROUND

The technical field generally relates to neutron detection sensors. Neutron detection depends upon having materials available that provide the ability to detect neutron events. However, many materials that absorb neutrons also absorb gamma radiation. Gamma radiation absorption can cause a false indication of a neutron event, or can occur at a frequency and with an effect that hides a neutron event detection. The development of materials and construction techniques for neutron sensors that improve neutron absorption efficiency while improving gamma radiation discrimination improves the performance of a particular neutron sensor. Further, new materials allow the construction of a neutron sensor using inexpensive or more broadly available materials. Therefore, further technological developments are desirable in this area.

SUMMARY

One embodiment is a unique apparatus for high probability neutron capture, including stereo detection elements for high selectivity between neutron and gamma radiation events. Other embodiments include unique methods, systems, and apparatus to detect neutron radiation events. Further embodiments, forms, objects, features, advantages, aspects, and benefits shall become apparent from the following description and drawings.

DESCRIPTION OF THE ILLUSTRATIVE EMBODIMENTS

Figure 1:
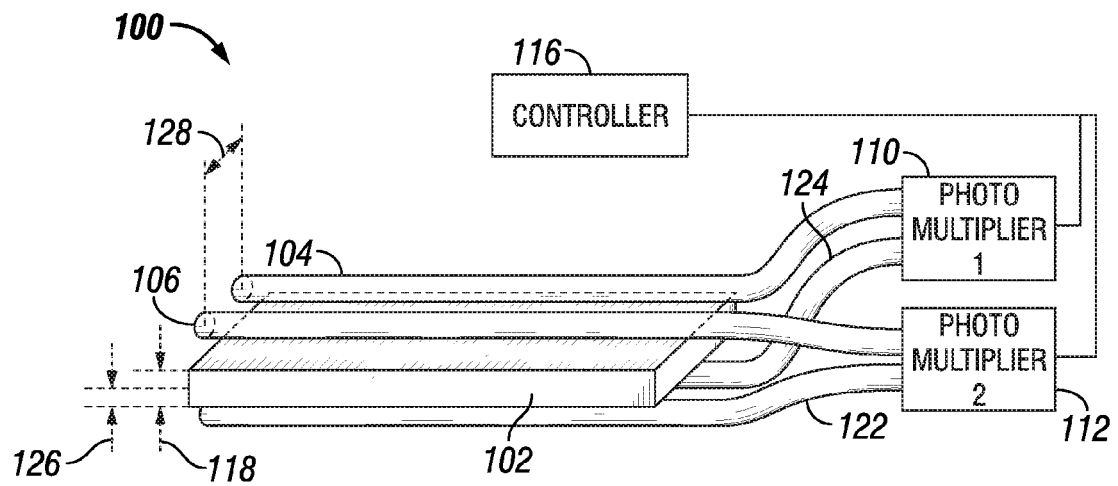
FIG. 1 is a schematic diagram of an apparatus to distinguish neutron from gamma radiation events.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referencing FIG. 1, a system 100 includes a neutron scintillator 102. The neutron scintillator 102 is a sheet of neutron absorptive material that has a thickness 118. The sheet of neutron absorptive material includes any neutron absorptive material known in the art, including generally materials having a low atomic mass. Exemplary materials include $^6$Li, $^{10}$B, ($^6$LiF:Y$_2$SiO$_5$:Ce), P47 phosphor, and an exemplary system includes $^6$LiF:ZnS/Ag. The neutron scintillator 102 may be a flat sheet as shown, or may be a curved surface, a corrugated sheet, or have other geometries that will be understood in the art. As is known in the art, an exemplary neutron scintillator 102 includes the neutron absorptive material, a scintillating material, and a binder. The thickness 118 is the perpendicular distance through the neutron scintillator 102 at the point of interest (which is generally the closest point of the surface of the light collector to the scintillator 102).

The neutron scintillator 102 has a thickness 118 greater than a thickness X 126. In a further embodiment, the neutron scintillator 102 has a thickness less than twice the thickness X 126. The thickness X 126 is an optimal scintillator thickness. The optimal thickness is dependent upon the specific application, and is the optimal thickness for a single light collector positioned in proximity to the scintillator 102. A thicker neutron scintillator 102 provides for absorbing a greater percentage of incident neutrons, but increases the chance than the neutron scintillator 102 will itself re-absorb the emitted photons before they reach a light collector. A thinner neutron scintillator 102 provides for a better chance for emitted photons to reach the light collector, but reduces the percentage of incident neutrons that are absorbed.

The optimal thickness is between a minimum thickness value providing a greatest photon emission quantity to an immediately proximate photo detector at a minimum neutron absorption value threshold, and a maximum thickness value providing a greatest neutron absorption value at a threshold minimum photon emission quantity to the immediately proximate light collector. In the embodiment illustrated in FIG. 1, light collectors that are wavelength shifting fiber optic elements (104, 106, 108, 120, 122, 124) are layered on both sides of the neutron scintillator 102, allowing the thickness 118 to be greater than the optimal thickness value 126. In certain embodiments, the thickness 118 is up to twice the optimal thickness value, although the thickness 118 may be provided at thicknesses beyond twice the optimal thickness value. Thicknesses 118 beyond twice the optimal thickness value will miss some detection events due to reabsorption of scintillated photons, but will absorb a higher percentage of incident neutrons. For many applications, utilizing a $^6$LiF:ZnS/Ag scintillator, the optimal thickness is up to about 0.5 mm. Accordingly, certain embodiments of the system 100 include a neutron scintillator 102 that is $^6$LiF:ZnS/Ag and has a thickness 126 greater than 0.5 mm, a thickness greater than 0.6 mm, a thickness between 0.6 mm and 1.0 mm, and/or a thickness greater than 0.5 mm and less than 1.0 mm inclusive.

The exemplary system 100 includes a first wavelength shifting fiber optic element 104 and a second wavelength shifting fiber optic element 106. The first wavelength shifting fiber optic element 104 is positioned in optical proximity to the neutron scintillator 102, and the second wavelength shifting fiber optic element 104 is positioned in optical proximity to the neutron scintillator 102 and parallel to the first fiber optic element 104 along at least a portion of the neutron scintillator 102. Parallel, as used herein, includes any segment(s) of the fiber optic elements 104, 106 that progress along a portion of the neutron scintillator 102 in proximity without crossing. The parallel segments may be straight, curvilinear, and may include some convergence or divergence of the fiber optic elements 104, 106 as long as they remain in proximity through the parallel segment(s).

The system 100 includes a first photo-multiplication device 110 optically coupled to the first fiber optic element 104, and a second photo-multiplication device 112 optically coupled to the second fiber optic element 106. The second fiber optic element 106 may be positioned next to the first fiber optic element 104, or at a distance 128 from the first fiber optic element 104 but within optical proximity. In certain embodiments, the second fiber optic element 106 is positioned within three fiber diameters of the first fiber optic element 104.

The fiber optic elements (104, 106, 122, 124) accept photons from the scintillator 102 and provide a photon response to the optically coupled photo-multiplication device 110, 112. A wavelength shifting fiber absorbs incident photons that intersect the fiber, and re-emits photons down the axis of the fiber. A doping material enables the absorption and re-emission, but also increases the attenuation of the fiber. Thus, the amount of doping material in the fiber and the length of the fiber are design choices within the skill of one in the art based on the specific neutron detection application. The fibers may be placed immediately proximate to the neutron scintillator 102. Adjacent fibers (e.g. 104, 106 or 122, 124) are optically coupled to distinct photo-multiplication devices 110, 112.

A gamma radiation event absorption on the scintillator 102 provides a photon burst with fewer photons that travel large distances before reabsorption. It has been observed with nominally sized fiber optic elements that a gamma radiation event is unlikely to provide photon responses in two fibers simultaneously, while a neutron radiation event frequently provides a photon response in two fibers simultaneously.

The system 100 further includes a controller 116 that distinguishes a neutron radiation event from a gamma radiation event in response to electronic signals from the distinct photo-multiplication devices 110, 112, 114. In one embodiment, the controller 116 determines the radiation event as a neutron radiation event in response to a simultaneous signal response from two distinct photo-multiplication devices 110, 112, each of the two photo-multiplication devices 110, 112 optically coupled to one of an adjacent pair of fiber optic elements 104, 106. For example, the controller 116 interprets a first electronic signal from the first photo-multiplication device 110, and interprets a second electronic signal from the second photo-multiplication device 112. Interpreting a data value includes, without limitation, reading the value from a memory location, receiving the value over a datalink, receiving the value as a physical value (e.g. a voltage reading from a sensor), and/or calculating the value from one or more other parameters. The controller 116 distinguishes a neutron radiation event from a gamma radiation event in response to the first electronic signal and the second electronic signal.

In certain embodiments, the controller 116 forms a portion of a processing subsystem including one or more computing devices having memory, processing, and communication hardware. The controller 116 may be a single device or a distributed device, and the functions of the controller 116 may be performed by hardware or software. In certain embodiments, the controller includes one or more modules structured to functionally execute the operations of distinguishing a neutron radiation event from a gamma radiation event. An exemplary controller 116 includes a photo detection module, a radiation discrimination module, and a neutron notification module.

The description herein including modules emphasizes the structural independence of the aspects of the controller 116, and illustrates one grouping of operations and responsibilities of the controller 116. Other groupings that execute similar overall operations are understood within the scope of the present application. Modules may be implemented in hardware and/or software on computer readable medium, and modules may be distributed across various hardware or software components. More specific descriptions of certain embodiments of controller operations are included in the section referencing FIG. 9.

Figure 10:
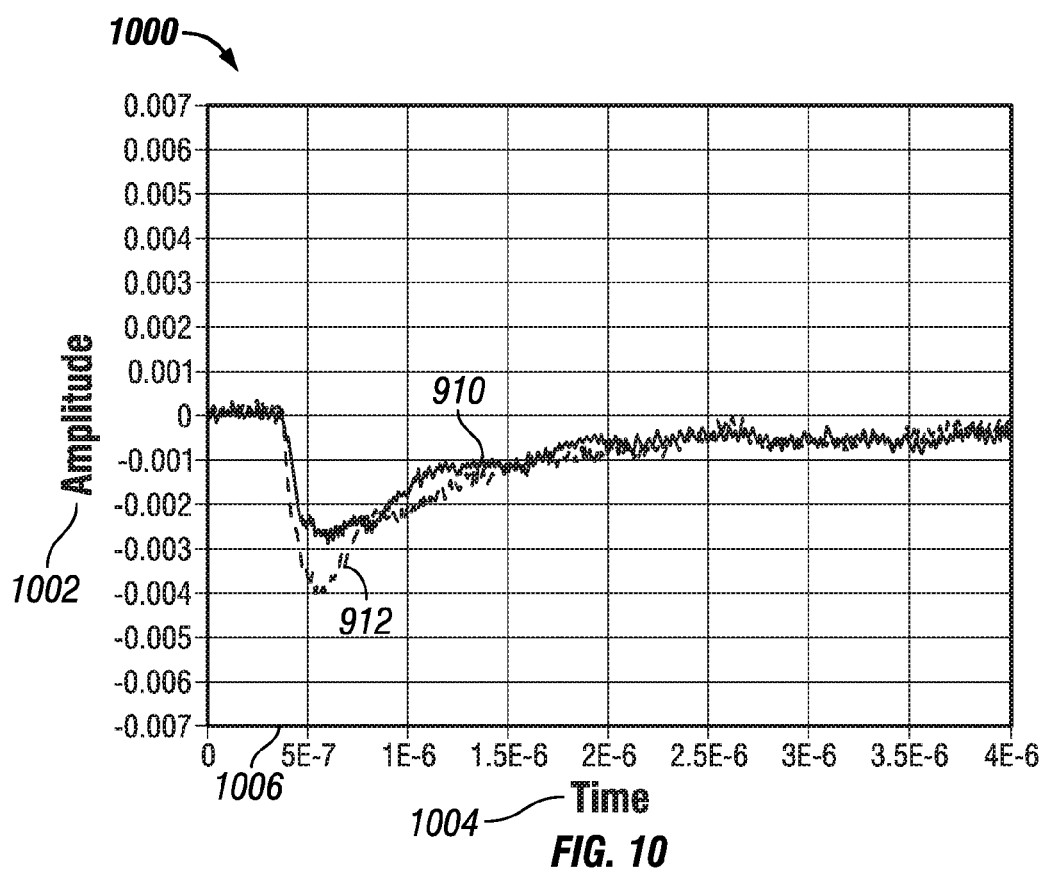
FIG. 10 shows illustrative data of a first and second electronic signal in response to a neutron radiation event.

Referencing FIG. 10, illustrative data of a first electronic signal 910 and a second electronic signal 912 shows typical responses in photon multiplication devices 110, 112 optically coupled to fiber optic elements positioned in proximity to a neutron scintillator 102 in response to a neutron radiation event. It is seen that both electronic signals 910, 912 show a response with significant amplitude 1002 shift above the noise amplitude that persists for a time 1004. From time zero 1006, there is significant amplitude deviation persisting for between about 200 ns (nano-seconds) to about 550 ns, depending upon the amplitude threshold selected to be significant. Further, some deviation is observed even beyond about 1,000 ns. The illustrated data is exemplary only, and the deviation time is dependent upon the type of material used in the neutron scintillator 102. The determination of the deviation time is a straightforward empirical step for one of skill in the art when the material for the neutron scintillator 102 is selected. Exemplary, non-limiting, deviation times that are determined to be neutron radiation events include 100 ns, 200 ns, and 550 ns.

Figure 11:
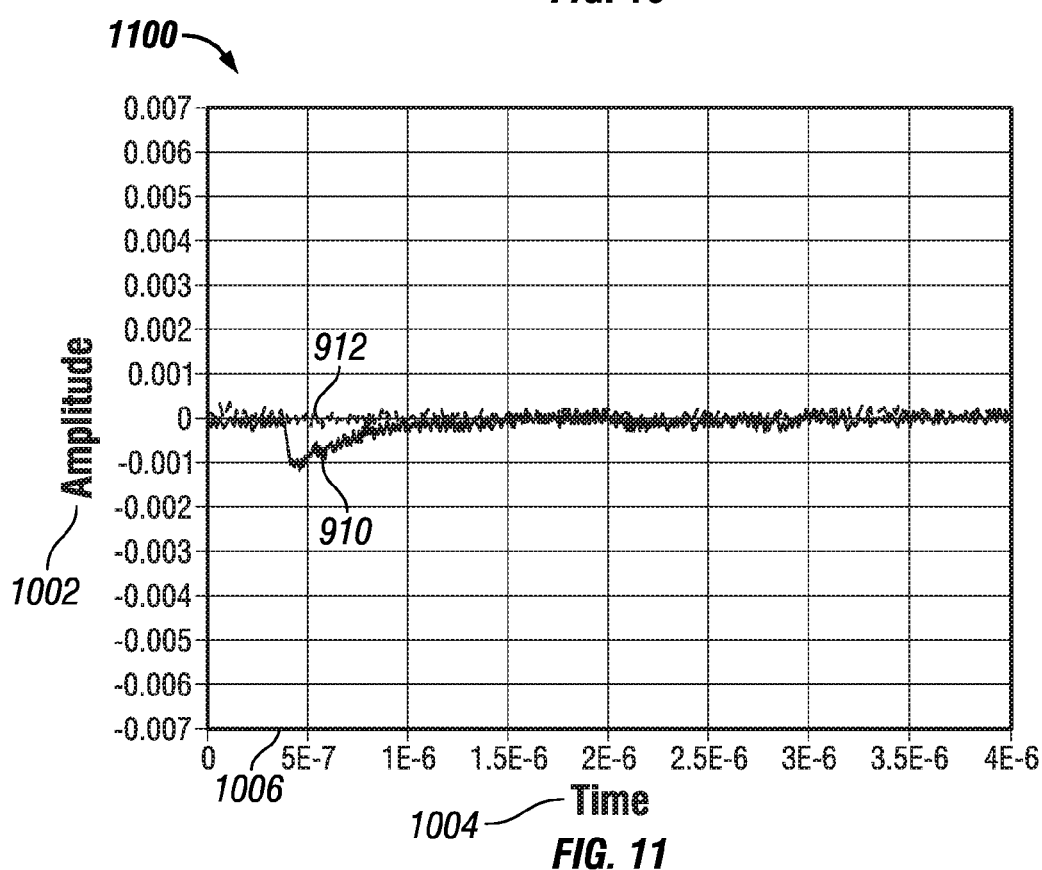
FIG. 11 shows illustrative data of a first and second electronic signal in response to a gamma radiation event.

Referencing FIG. 11, illustrative data of a first electronic signal 910 and a second electronic signal 912 shows typical responses in photon multiplication devices 110, 112 optically coupled to fiber optic elements positioned in proximity to a neutron scintillator 102 in response to a gamma radiation event. From time zero 1006, an amplitude 1002 deviation is observed in one of the photo-multiplication devices 110, 112 but not in the other photo-multiplication device 110, 112. Further, the amplitude of the deviation in response to the gamma radiation event is lower than the amplitude deviation of the neutron radiation event.

In certain embodiments, either the amplitude 1002, the time 1004, or both, of the responses observed in the electronic signals 910, 912 may be utilized to distinguish a neutron radiation event from a gamma radiation event. It has been observed that, for parsing the neutron events from the gamma events utilizing time 1004, a first threshold amplitude deviation in both signals 910, 912 that persists for a second threshold time provides a reliable distinction between neutron radiation events and gamma radiation events. The first threshold amplitude deviation may be set to a relatively low value to provide for high percentage detection of neutron events—for example 10 times an average noise level of deviation, or 5 times an average noise level of deviation. For example, if the noise level of deviation is an amplitude of approximately −0.0001, the first threshold amplitude deviation may be −0.0005. In certain embodiments, the first threshold amplitude deviation may be set even lower. Where the photomultiplier device is a photomultiplier tube (PMT), the first threshold amplitude deviation may be set to a relatively high value. A threshold of 10 times an average noise level of deviation, 50 times, 100 times, or even greater may be selected with a PMT.

The second threshold time deviation may be set to a value of 100 ns, 200 ns, 550 ns, or another value based upon empirically determined duration values observed for the particular system 100 that will be understood to one of skill in the art. The second threshold time deviation may further be a function of the processing components (e.g. filters, A/D converters, fault handling of circuit values, etc.) utilized to determine the electronic signals 910, 912. For example, a processor may poll the electronic signals 910, 912 over a series of time slices (e.g. in response to the execution cycle time of an algorithm operating on a computer processor), and if the amplitude deviation is observed in both signals 910, 912 for a specified number of polling events then the event may be determined to be a neutron radiation event.

In a further embodiment, processing may determine an event as a neutron radiation event even if one or more of the polling events of the electronic signals 910, 912 do not show the amplitude deviation as long as a statistically significant number of the polling events show the amplitude deviation. For example, if several polling samples are taken over a period of time, and one or more of the intermediate polling samples do not show an amplitude deviation, but some samples before and after the intermediate polling samples do show an amplitude deviation, the intermediate polling samples may be deemed to be erroneous, to be affected by noise, and/or to be a portion in time during the photon cascade following the neutron event that did not have photons arriving at the photo sensor. In one example, if two polling samples in four sampling periods show an amplitude deviation, the processing determines that an amplitude deviation has occurred over the four sampling periods.

Those of skill in the art will understand that normal signal processing used for high-speed, noisy electronic signals may be utilized within the scope of the previous descriptions. For example, the electronic signals 910, 912 may be low-pass filtered, reducing both the noise amplitude and the response amplitude (depend upon the filter time constant utilized). A filter may also potentially change the ratio typically observed between the noise amplitude and the response amplitude, thereby affecting the value used for the first threshold amplitude deviation. Further, filtering may change the persistence time of the response affecting the second threshold time deviation.

In certain embodiments, time-averaged segments of the amplitude 1002 may be utilized in calculations rather than filtered values, providing a common, crude, type of filtering. In certain embodiments, the electronic signals may be subjected to de-bouncing, rationality checks, removal of values thought to be erroneous, or other processing that can affect the appropriate values of the first threshold amplitude deviation and the second threshold time. One of skill in the art, having the benefit of the descriptions herein, can readily apply the designed filtering, time averaging, or other processing, to the electronic signals 910, 912, test the response of the system 100 to a neutron radiation event and a gamma radiation event, and set appropriate values for the first threshold amplitude deviation and the second threshold time accordingly.

Figure 2:
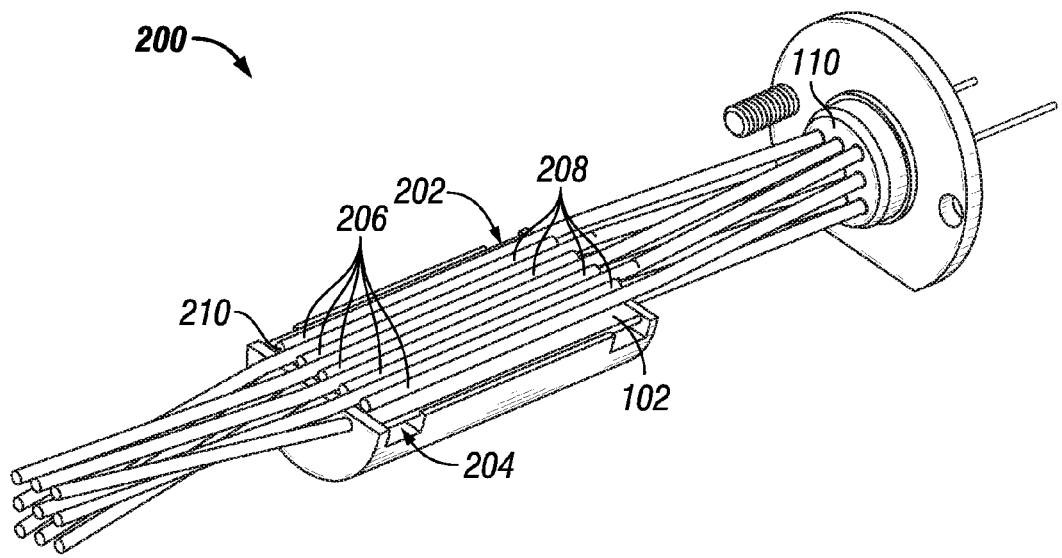
FIG. 2 is a schematic diagram of an apparatus having two layers of fiber optic elements positioned with one layer on each side of a neutron scintillator.

Referencing FIG. 2, a system 200 includes a first layer 202 of wavelength shifting fiber optic elements in optical proximity to the neutron scintillator 102 on a first side (the top in FIG. 2) of the neutron scintillator 102. Alternating fibers of the first layer are optically coupled to distinct photo-multiplication devices. For example, the set 206 of alternating fibers are optically coupled to a first photo-multiplication device 110, and the set 208 of alternating fibers are optically coupled to a second photo-multiplication device (not shown). The fibers in FIG. 2 are alternating pairs (i.e. a 206 fiber, then a 208 fiber), but the fibers may also be alternating (i.e. sequenced) in triplets or greater numbers of fibers in each sequence. Any two adjacent fibers in a layer 202, 204 are optically coupled to distinct photo-multiplier devices, but otherwise any sequencing or arrangement is possible. The system 200 includes a second layer 204 of wavelength shifting fiber optic elements in optical proximity to the neutron scintillator 102 on a second side (the bottom in FIG. 2) of the neutron scintillator.

Figure 3:
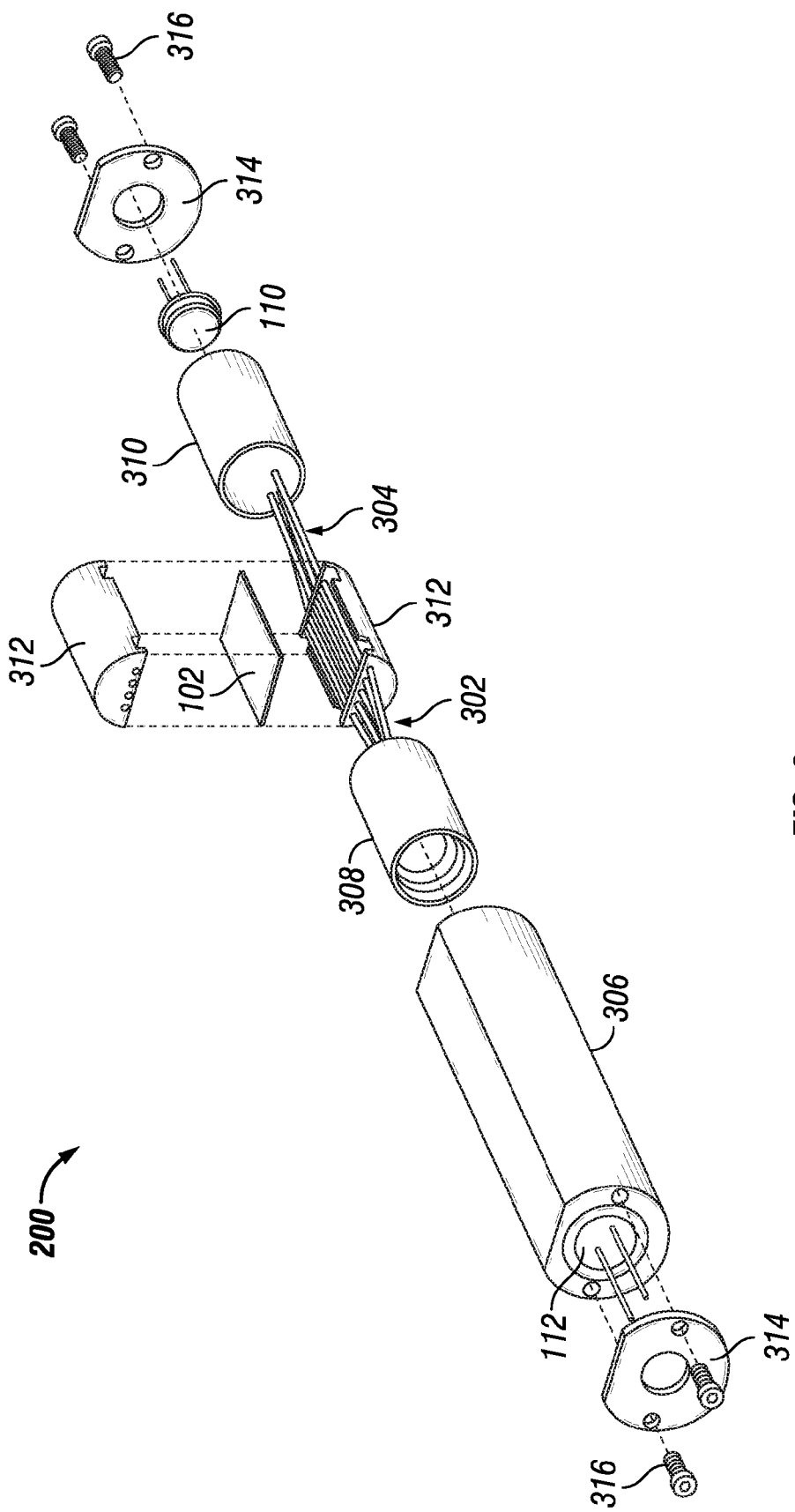
FIG. 3 is an exploded diagram of an assembly for neutron detection having enhanced absorption and bifurcated detection elements.

Referencing FIG. 3, an exploded view of the system 200 illustrates the second photo sensor 112. The first set of fibers 302 are from the second layer 204 passing to the second photo sensor 112, and the second set of fibers 304 are from the second layer 204 passing to the first photo sensor 112, with alternating fibers from the second layer 204 going to distinct photo sensors 110, 112. FIG. 3 illustrates only the second layer 204 of fibers below the neutron scintillator 102 for ease of visualization, but the first layer 202 of fibers will be present, for example as illustrated in FIG. 2.

In the embodiment of FIG. 2, a first set of the alternating fibers from the first layer 202 (e.g. the "odd" numbered fibers from the first layer 202) and a second set of the alternating fibers from the second layer 204 (e.g. the "even" numbered fibers from the second layer 204) are all optically coupled to the first distinct photo-multiplication device 110. A neutron event affecting the first layer 202 is unlikely to simultaneously affect the second layer 204, allowing the utilization of a single photo-multiplication device 110 to acceptably manage one set of fibers from each layer. A third set of the alternating fibers from the first layer 202 (e.g. the "even" numbered fibers from the first layer 202) and a fourth set of the alternating fibers from the second layer 204 (e.g. the "odd" numbered fibers from the second layer 204) are likewise optically coupled to the second distinct photo-multiplication device 112 (not shown—see FIG. 3).

The illustration of FIG. 2 and FIG. 3 shows 9 fibers directed to each photo-multiplication device 110, 112. Particular embodiments may include a greater number of fibers to each photo-multiplication device, or a few number of fibers to each photo-multiplication device.

A low ratio of fibers per photo-multiplication device provides costs and benefits. Increasing the number of photo-multiplication devices increase the cost of the system 100. Photo-multiplication devices may be photo-multiplier tubes, which are highly capable (allowing, e.g. fibers that are longer or spaced further apart for a larger total neutron scintillator coverage area) but very expensive. Where the photo-multiplication devices are solid state photo sensors, the costs are greatly reduced, rendering a lower fiber to photo-multiplication device ratio more economical. A large number of photo-multiplication devices also increases the processing burden of the controller 116, and thus increases the cost of hardware and software for the controller 116 and the communications between the controller 116 and the photo-multiplication devices.

Decreasing the number of photo-multiplication devices, with the same number of fibers, increases the number of events that each photo-multiplication device is experiencing, increasing the chance that independent events will occur within a short enough time span to complicate or even prevent proper detection of neutron events. For example, background gamma radiation causes amplitude excursions on the electronic signals 910, 912 (e.g. reference FIG. 11). Where a single photo-multiplication device services too many fibers, the photo-multiplication device will see an amplitude excursion for a high percentage of the time that is not related to a neutron event, preventing the detection of neutron events and/or causing a significant number of simultaneous amplitude excursions in other photo-multiplication devices, which in turn causes false neutron detections.

In certain embodiments, the ratio of fibers to photo-multiplication devices is between 1:1 and 9:1, inclusive. The higher limit of the ratio of fibers is limited by the background radiation flux, the size of the fiber end face, and the size of the photo-multiplier receiving face. In certain embodiments, the ratio of fibers to photo-multiplication devices is between 2:1 and 40:1, or between 10:1 and 40:1. In certain further embodiments, the ratio of fibers to photo-multiplication devices is between 10:1 and 100:1. The higher values of fiber ratios may be useful in a very low flux environment where gamma background radiation is infrequent.

In certain embodiments, each of the alternating fibers is mirrored at an end of each fiber, and the distinct photo-multiplication devices are optically coupled to the alternating fibers at an opposite end of each fiber. For example, referencing FIG. 2, the alternating fibers 206 are each mirrored at the left-hand side and optically coupled to the first photo-multiplication device 110 at the right-hand side. The alternating fibers 208 are each mirrored at the right-hand side and optically coupled to the second photo-multiplication device 112 (reference FIG. 3) at the left-hand side.

Figure 5:
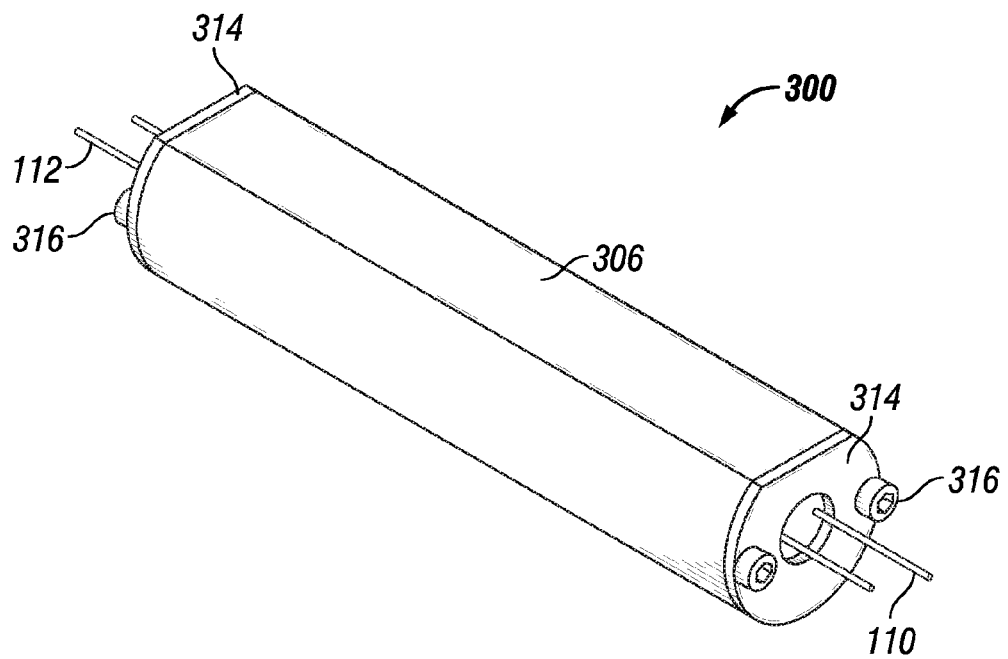
FIG. 5 is a perspective view of the assembly for neutron detection having enhanced absorption and the bifurcated detection elements.
Figure 7:
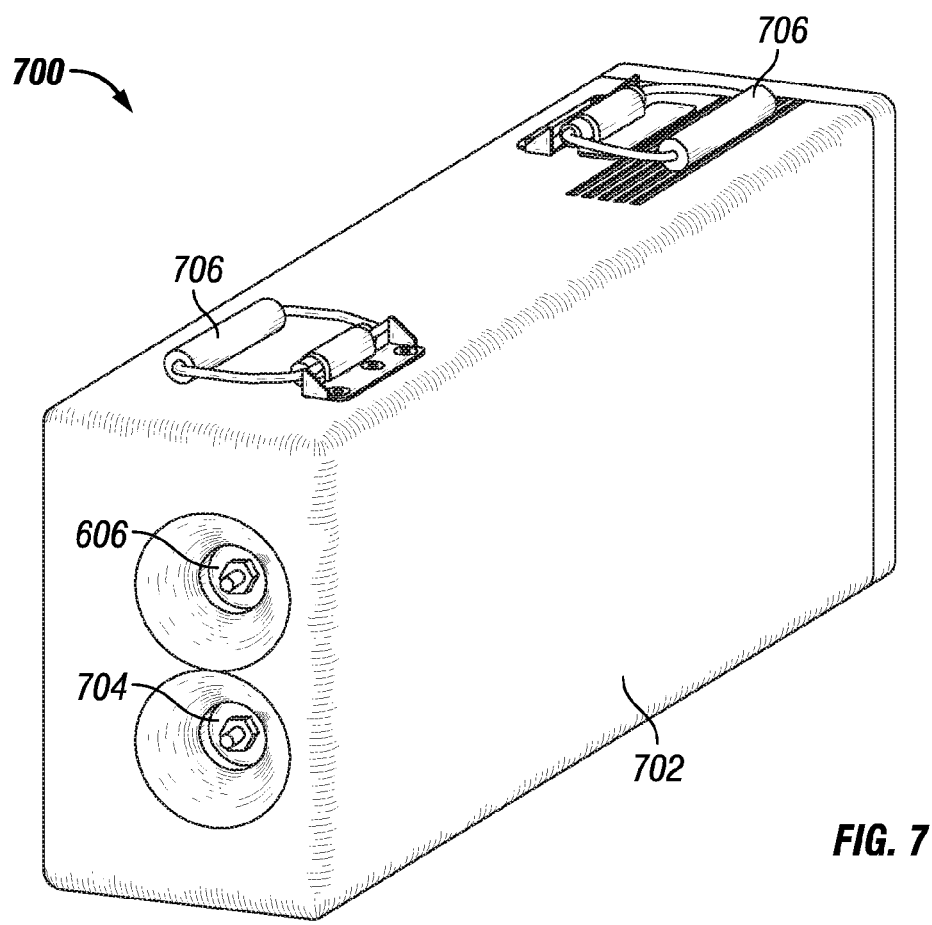
FIG. 7 is a perspective view of a portable neutron detector.

Referencing FIG. 7, a neutron detector 700 includes a housing 702 defining the neutron scintillator, the alternating fibers, the distinct photo-multiplication devices, and the controller. An exemplary neutron detector 700 includes an assembly 300 as illustrated in FIG. 5. The assembly 300, controller 116, and required wiring, etc. may be secured in the housing 702 in a manner understood to one of skill in the art and that is not described herein.

Figure 4:
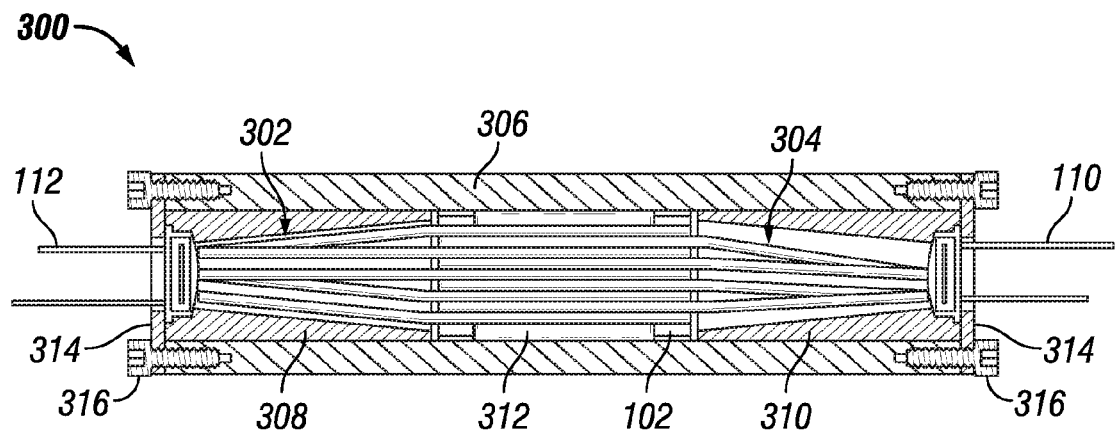
FIG. 4 is a cutaway view of the assembly for neutron detection having enhanced absorption and the bifurcated detection elements.

The assembly 300 is shown in exploded view in FIG. 3, and includes the first and second photo-multiplication devices 110, 112, each coupled to alternating fibers for a first layer 202 and a second layer 204, such that all adjacent fibers are optically coupled to distinct (i.e. separate) photo-multiplication devices. The assembly 300 further includes a neutron scintillator 102, a first and second convergence barrel 308, 310, and a containment core 312. The assembly 300 is contained in an inner housing 306 having end caps 314 with cap screws 316. The photo-multiplication devices 110, 112 have leads that connect to a controller 116 (not shown) within the housing 702. A cutaway view of the intact assembly 300 is illustrated in FIG. 4. The assembly includes 9 fibers in each layer 202, 204, with 9 fibers passing to the first photo-multiplication device 110 (5 from the top layer 202 and 4 from the bottom layer 204) and 9 fibers passing to the second photo-multiplication device 112 (4 from the top layer 202 and 5 from the bottom layer 204). The photo-multiplication devices 110, 112 are photomultiplier diodes having a 3 mm by 3 mm photo-sensitive area optically coupled to each of the 9 fibers in a 3×3 fiber configuration.

For a typical commercially available wavelength shifting fiber, the limit of the attenuation length (1/e) of a fiber connected to a photo-multiplication device is about 1 meter. Therefore, the outer limit of the length of the neutron scintillator 102, having a single stage of wavelength shifting fibers in the axial direction is a little less than 1 meter. For fibers having low attenuation doping materials, or attached to photo-multiplication devices having a very high gain, longer fibers may be possible. Further, more than one stage of fibers may be included along the length of the neutron scintillator 102, which may be attached to the photo-multiplication devices positioned at an intermediate axial position along the scintillator (not shown) or to an additional set of photo multiplication devices. A scintillator having a length less than one meter is sufficient for most hand-held neutron detector applications.

The housing 702 may include a material selected to perform as a moderator. High energy neutrons are likely to pass through the neutron scintillator 102 and are either unaffected by the scintillator 102, or are merely scattered rather than absorbed. A moderator is a material that scatters the neutron and reduces the energy of the neutron into the thermal energy range, which is more likely to be absorbed by the scintillator 102. Polyethylene having a thickness of 1-2 inches provides suitable moderation, structural integrity, and allows the neutron detector 700 to be light enough to be mobile. The housing 702 further includes a power input 802 (reference FIG. 8) and a neutron reporting output 606. The neutron reporting output 606 may be any output device known in the art, including a sound, electronic, optical, or communication (e.g. network or datalink) signal. The housing 702 may be further plated or covered, to protect the moderator from wear and/or to provide a desired look to the neutron detector 700. In certain embodiments, the housing may be a material that is nearly transparent to neutrons, for example aluminum.

Figure 8:
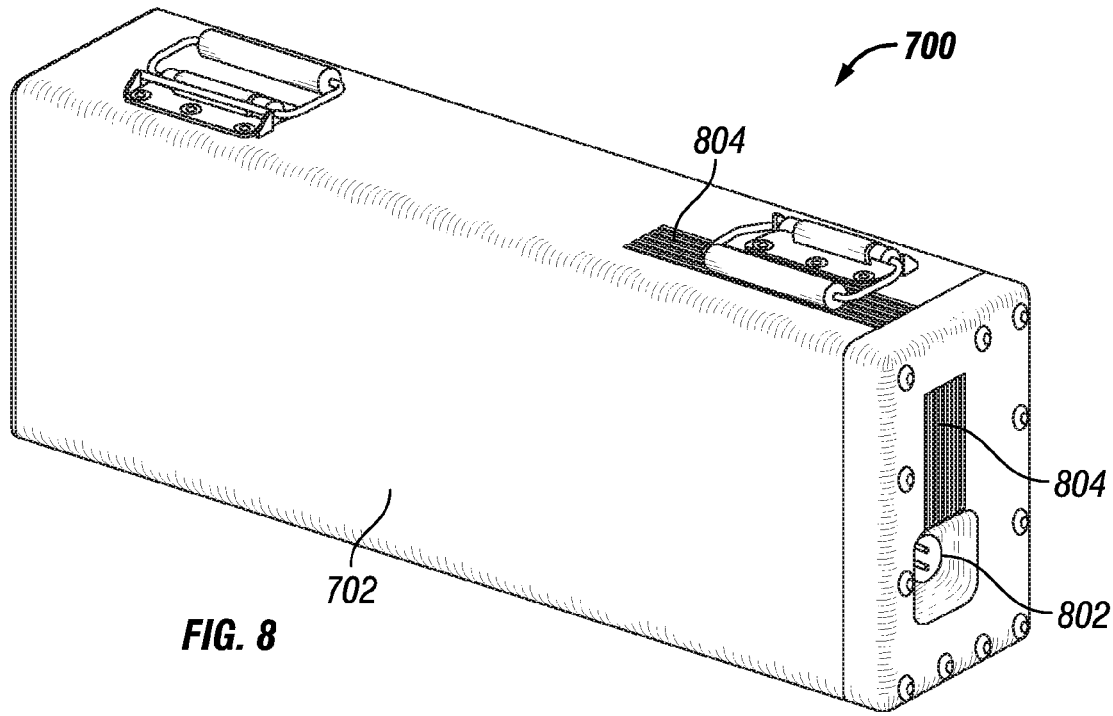
FIG. 8 is another perspective view of the portable neutron detector.

The neutron detector 700 may further include a gamma radiation output 704, handles 706, and vents 804 (reference FIG. 8 to allow cooling of the electronic components. In certain embodiments, the neutron detector 700 is a portable neutron detector weighing less than 35 kg (77 lbs.).

The photo-multiplication devices described herein may be any photo-multiplication device known in the art, including a photo-multiplier tube or a solid state photo-multiplier (e.g. a photomultiplier diode). A specific gain value for the photo-multiplication device cannot be specified for all embodiments, but the gain value for any particular application is dependent upon the application of the neutron detector, including at least neutron delivery and device parameters. Exemplary neutron delivery parameters include, without limitation, the expected neutron flux, distance to the source, and the neutron detection percentage required. Exemplary device parameters include, without limitation, the type of scintillator utilized, the percentage of scintillated photons that are captured by the fiber optic elements, and the length and attenuation of the fiber optic elements.

Gain values provided by commercially available photomultiplier tubes are commonly known to provide sufficient photo-multiplication for neutron detection applications. The exemplary instance of FIG. 2 utilizes photomultiplier diodes 110. Where the neutron scintillator is a $^6$LiF:ZnS/Ag material, and where the wavelength shifting fibers are less than about 1 m in length, the fibers are positioned in close proximity to the scintillator (e.g. <0.5 mm), and the fibers are positioned relatively close to each other (e.g. <2.1 mm center-to-center), a photomultiplier diode providing a gain of at least $10^6$ has been found to acceptably provide photo-multiplication for neutron indication for high percentage neutron event detection. An exemplary suitable photomultiplier diode is a device type MAPD-3N "Micro-pixel Avalanche Photo-Diode" manufactured by Zecotek Photonics Inc., located at Suite 408 6190 Agronomy Road, University of British Columbia, Vancouver, BC V6T 1Z3, Canada.

Figure 6A:
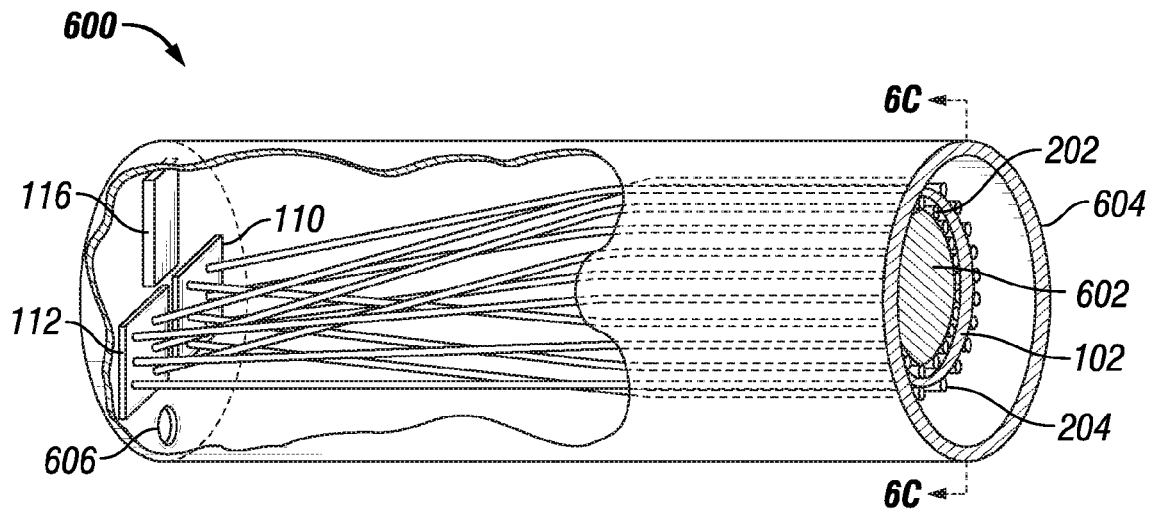
FIG. 6A is a perspective view of an apparatus for directional neutron detection.

Referencing FIG. 6A, an embodiment of the system 600 includes a cylindrical shield 604 defining a moderator 602. The moderator 602 is a material that reduces high energy neutrons to a thermal energy condition. The cylindrical shield 604 is open at one end (or both ends), and includes a material that blocks neutrons from reaching the moderator. The cylindrical shield 604 additionally or alternatively blocks thermal neutrons from reaching the neutron scintillator 102. An exemplary material for the shield 604 includes gadolinium, although other neutron blocking materials are known and contemplated herein.

Figure 6B:
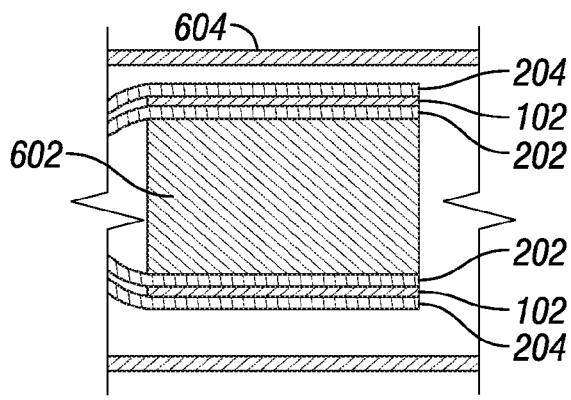
FIG. 6B is a cutaway view of an apparatus for directional neutron detection.
Figure 6C:
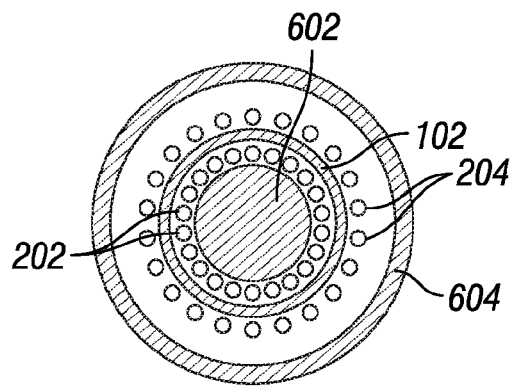
FIG. 6C is an end view of an apparatus for directional neutron detection.

The exemplary system 600 includes the moderator 602 positioned as a central cylinder within the cylindrical shield 604, with the neutron scintillator 102 positioned as a cylindrical shell around the moderator 602. The exemplary system 600 further includes a first photo-multiplication device 110 and second photo-multiplication device 112 that are optically coupled to wavelength shifting fiber optic elements positioned in proximity to the scintillator 102 such that adjacent fiber optic elements are optically coupled to distinct photo-multiplication devices 110, 112. The system 600 includes a first layer of fibers 202 as a concentric inner layer, and a second layer of fibers 204 as a concentric outer layer. The system 600 further includes a controller 116 that distinguishes a neutron radiation event from a gamma radiation event. The system 600 further includes an output device 606. FIG. 6B illustrates a partial cutaway view of the system 600, including the cylindrical shield 604, a side view of the moderator 602, the scintillator 102, inner layer of fibers 202, and outer layer of fibers 204. FIG. 6C illustrates an end view of the system 600, looking into the open end of the cylindrical shield 604.

Figure 12:
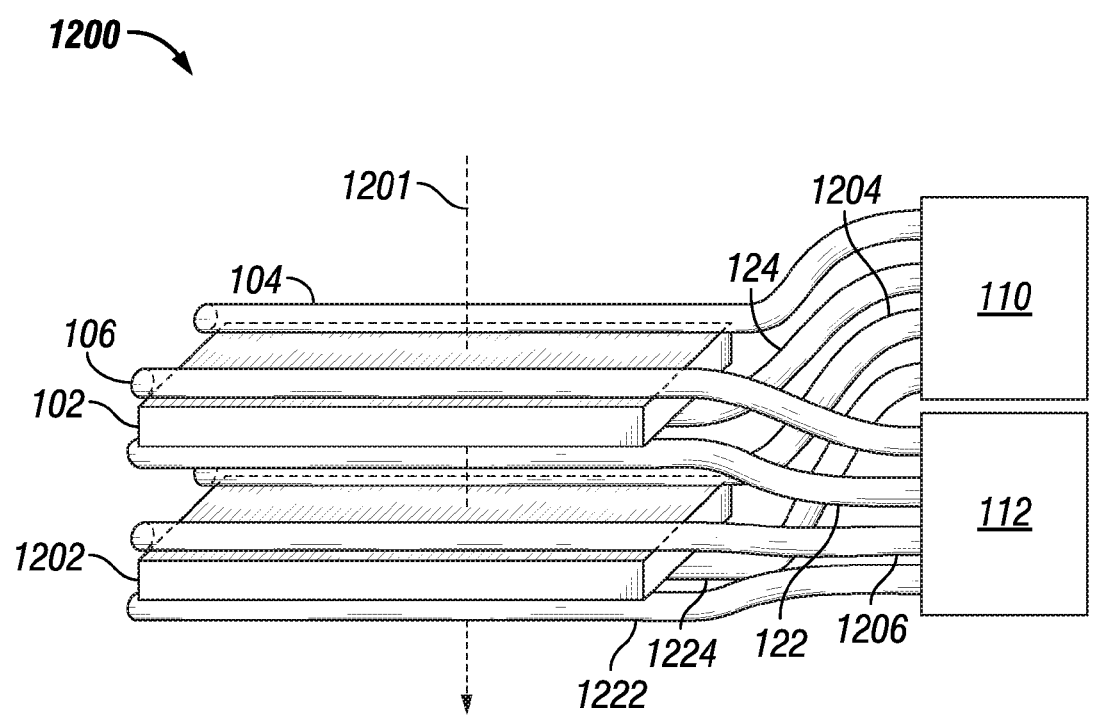
FIG. 12 is a schematic diagram of a portion of an apparatus to distinguish neutron from gamma radiation events.

Referencing FIG. 12, a portion of an exemplary system 1200 is illustrated having a second neutron scintillator 1202 that is a sheet of neutron absorptive material having a thickness greater than 1.0× and less than or equal to 2.0×. The exemplary system 1200 further includes a third layer of wavelength shifting fiber optic elements 1204, 1206 in optical proximity to the second neutron scintillator 1202 on a first side of the second neutron scintillator 1202. The system 1200 further includes a fourth layer of wavelength shifting fiber optic elements 1222, 1224 in optical proximity to the second neutron scintillator 1202 on a second side of the second neutron scintillator 1202. Alternating fibers of the third layer 1204, 1206 are optically coupled to distinct photo-multiplication devices 110, 112. In the example, fiber 1204 is optically coupled to photo-multiplication device 110 and fiber 1206 is optically coupled to photo-multiplication device 112. Alternating fibers of the fourth layer 1222, 1224 are likewise optically coupled to distinct photo-multiplication devices 110,112. In the example, fiber 1222 is optically coupled to photo-multiplication device 112 and fiber 1224 is optically coupled to photo-multiplication device 110.

In certain embodiments, the first neutron scintillator 102 and the second neutron scintillator 1202 include at least a portion of each scintillator 102, 1202 that are parallel planes and/or parallel curviplanar structures. Accordingly, an incident neutron particle 1201 is likely to intersect both neutron scintillators 102, 1202 in the parallel portion, increasing the likelihood that the incident neutron particle 1201 will be absorbed by one of the neutron scintillators 102, 1202.

Figure 9:
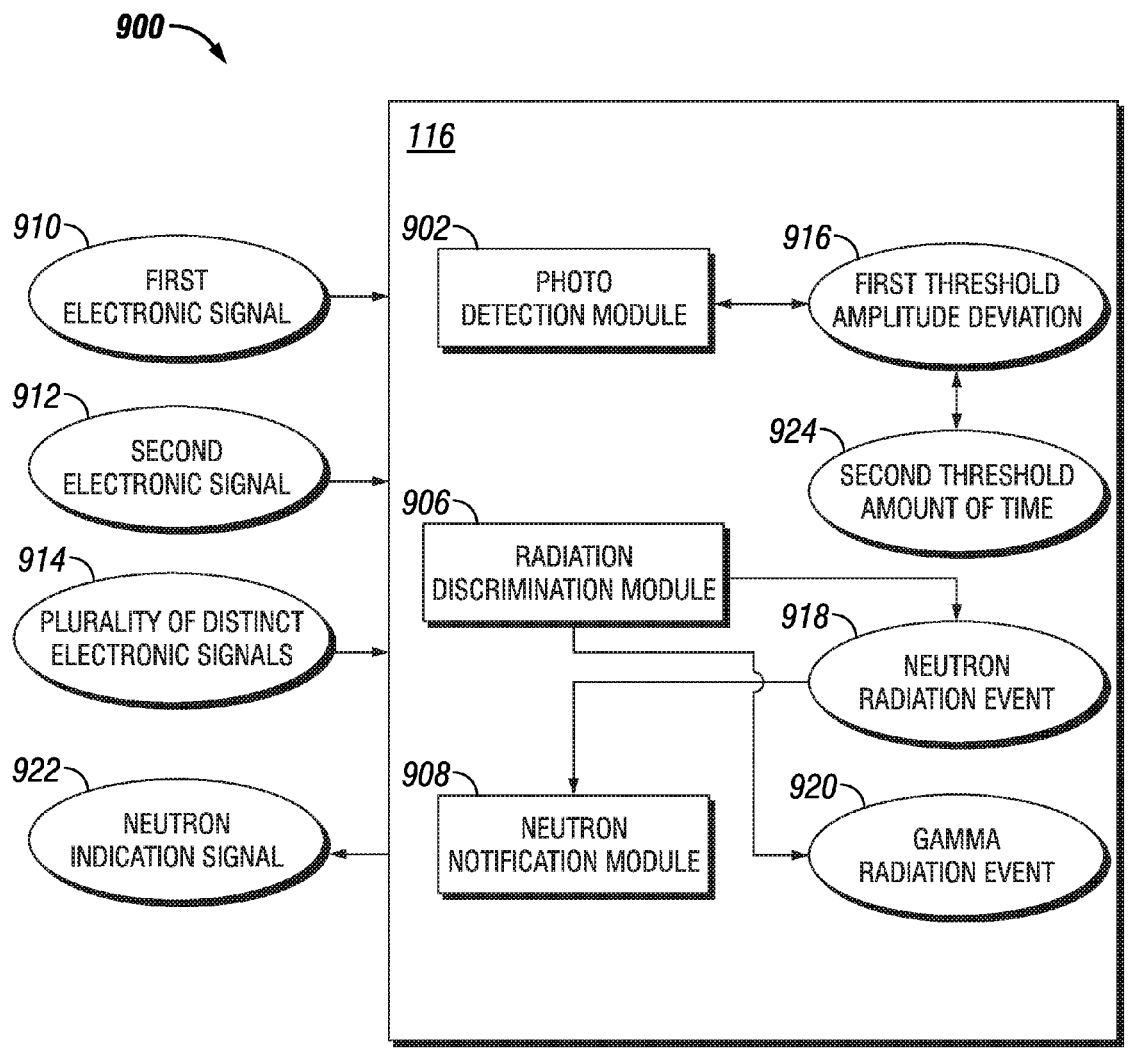
FIG. 9 is a schematic diagram of a processing subsystem for distinguishing a neutron from a gamma radiation event.

FIG. 9 is a schematic diagram of a processing subsystem 900 for distinguishing a neutron from a gamma radiation event. The subsystem 900 includes a controller 116 having modules structured to functionally perform operations to distinguish a neutron radiation event 918 from a gamma radiation event 920. The controller 116 includes a photo detection module 902 that interprets a first electronic signal 910 provided by a first photo-multiplication device and interprets a second electronic signal 912 provided by a second photo-multiplication device. In certain embodiments, the photo detection module 902 may determine additional electronic signals from a plurality of distinct electronic signals 914, each of the electronic signals 914 being provided from a distinct photo-multiplication device.

The first photo-multiplication device is optically coupled to a first wavelength shifting fiber optic element positioned in optical proximity to a neutron scintillator. The second photo-multiplication device is optically coupled to a second wavelength shifting fiber optic element positioned in optical proximity to the neutron scintillator and further positioned parallel to the first fiber optic element along at least a portion of the neutron scintillator. The controller 116 further includes a radiation discrimination module 906 that determines that a neutron radiation event 918 has occurred in response to the first electronic signal 910 and the second electronic signal 912 simultaneously exceeding a first threshold amplitude deviation 916. The controller 116 further includes a neutron notification module 908 that provides a neutron indication signal 922 to an output device in response to the determining that the neutron radiation event 928 has occurred.

The neutron indication signal 922 may be any signal understood in the art, including at least a voltage, current, datalink or network parameter, and/or a software value stored on a computer readable medium. The output device may be a display value on a computer screen, a speaker, a light, a datalink or network, a written output on a printable medium, a computer readable medium such as an external (relative to the controller 116) storage device, and/or any other type of output known in the art.

In further embodiments, the radiation discrimination module 906 further determines that a gamma radiation event 920 has occurred in response to only one of the first electronic signal 910 and the second electronic signal 912 exceeding the first threshold amplitude deviation 916. An exemplary radiation discrimination module 906 further determines the neutron radiation event 918 has occurred in response to the first electronic signal 910 and the second electronic signal 912 simultaneously exceeding the first threshold amplitude deviation 916 for a second threshold amount of time 924.

Illustrative operations for performing procedures for distinguishing neutron radiation events from gamma radiation events are described. Operations illustrated are understood to be exemplary only, and operations may be combined or divided, and added or removed, as well as re-ordered in whole or part, unless stated explicitly to the contrary herein. Certain operations described may be implemented by a computer executing a computer program product on a computer readable medium, where the computer program product comprises instructions causing the computer to execute one or more of the operations, or to issue commands to other devices to execute one or more of the operations.

An exemplary procedure includes an operation to provide a neutron detection platform including a neutron scintillator, a first wavelength shifting fiber optic element positioned in optical proximity to the neutron scintillator, and a second wavelength shifting fiber optic element positioned in optical proximity to the neutron scintillator and further positioned parallel to the first fiber optic element along at least a portion of the neutron scintillator. The neutron detection platform further includes a first photo-multiplication device that provides a first electronic signal and a second photo-multiplication device that provides a second electronic signal, with the first photo-multiplication device optically coupled to the first fiber optic element and with the second photo-multiplication device optically coupled to the second fiber optic element.

The procedure further includes an operation to provide the neutron detection platform, an operation to interpret the first electronic signal and the second electronic signal, and an operation to determine that a neutron radiation event has occurred in response to the first electronic signal and the second electronic signal simultaneously exceeding a first threshold amplitude deviation. An exemplary first threshold amplitude deviation is a deviation that is at least 10 times, or at least 50 times, a noise level amplitude deviation. The noise level amplitude deviation may be an averaged maximum noise deviation observed over a period of time, a specified noise level (e.g. entered as a calibration), and/or a maximum deviation observed at certain response frequencies or with certain signal filters applied to the first and second electronic signals.

The exemplary procedure includes the operation to determine that the neutron radiation event has occurred in response to the first electronic signal and the second electronic signal simultaneously exceeding the first threshold amplitude deviation for a second threshold amount of time. The second threshold amount of time may be 100 ns, 200 ns, 550 ns, and/or an amount of time long enough to provide confidence that a radiation event is not a gamma radiation event.

A further exemplary procedure includes an operation to determine an optimal thickness for the neutron scintillator and an operation to provide the neutron scintillator with a thickness greater than the optimal thickness and less than twice the optimal thickness. The further exemplary procedure includes the provided neutron detection platform having the first and second fiber optic elements on a first side of the neutron scintillator, and the neutron scintillator having a second side with a third wavelength shifting fiber optic element and a fourth wavelength shifting fiber optic element positioned in optical proximity to the second side. The fourth wavelength shifting fiber optic element is further positioned parallel to the third fiber optic element along at least a portion of the neutron scintillator, and the third fiber optic element and the fourth fiber optic element are optically coupled to distinct photo-multiplication devices.

Yet another exemplary embodiment is a neutron detection system including a neutron scintillator having a neutron absorption material. Exemplary materials include $^6$Li, $^{10}$B, ($^6$LiF:Y$_2$SiO$_5$:Ce), and/or P47 phosphor. The system further includes a number of light gathering elements, which may be wavelength shifting fiber optic elements, positioned in optical proximity to the neutron scintillator, where adjacent light gathering elements are optically coupled to distinct photo-multiplication devices. The system further includes means for distinguishing a neutron radiation event from a gamma radiation event. Non-limiting examples of means for distinguishing a neutron radiation event from a gamma radiation event are described.

One means for distinguishing a neutron radiation event from a gamma radiation event includes interpreting electronic signals from two distinct photo-multiplication devices that are optically coupled to the light gathering elements. The means further includes determining that an event is a neutron radiation event in response to both of the electronic signals indicating a simultaneous amplitude deviation, and determining that an event is a gamma radiation event in response to only one of the electronic signals indicating an amplitude deviation. The amplitude deviation is an amount that is selected that has at least a minimum confidence value that the amplitude is not a noise amplitude, and may be an amplitude deviation of at least 10 times, or at least 50 times, a noise deviation. An exemplary amplitude deviation is determined from a number of time samples, where more than a specified number of the time samples indicate the amplitude deviation is occurring.

Another means for distinguishing a neutron radiation event from a gamma radiation event includes interpreting electronic signals from two distinct photo-multiplication devices that are optically coupled to the light gathering elements. The means further includes determining that an event is a neutron radiation event in response to both of the electronic signals indicating a simultaneous amplitude deviation for a period of time that exceeds a threshold period of time. The threshold period of time is 100 ns, 200 ns, and/or 550 ns. The amplitude deviation is an amount that is selected that has at least a minimum confidence value that the amplitude is not a noise amplitude, and may be an amplitude deviation of at least 10 times, or at least 50 times, a noise deviation. An exemplary amplitude deviation is determined from a number of time samples, where more than a specified number of the time samples indicate the amplitude deviation is occurring Another exemplary system includes a second neutron scintillator that is a sheet of neutron absorptive material having a thickness greater than 1.0× and less than or equal to 2.0×. The exemplary system further includes a third layer of wavelength shifting fiber optic elements in optical proximity to the second neutron scintillator on a first side of the second neutron scintillator, and a fourth layer of wavelength shifting fiber optic elements in optical proximity to the second neutron scintillator on a second side of the second neutron scintillator. Alternating fibers of the third layer are optically coupled to distinct photo-multiplication devices, and alternating fibers of the fourth layer are likewise optically coupled to distinct photo-multiplication devices. A further exemplary system includes at least a portion of the first and second neutron scintillators positioned as parallel planes, or parallel curviplanar structures.

Certain embodiments of the exemplary system include means for directional detection of the neutron radiation event. Non-limiting examples of means for directional detection of the neutron radiation event are described. One means for directional detection of the neutron radiation event includes a cylindrical shield open on at least one end. The cross-section of the cylindrical shield may be any shape, including circular, and the cross-sectional shape or size may vary along the axial length of the cylindrical shield. A moderator is positioned within the shield such that neutrons reach the moderator through only the open end(s) of the shield. The shield includes a neutron shielding material, including one or more of gadolinium, samarium, lead, cadmium, hafnium, and tungsten. The system includes a neutron scintillator in proximity to the moderator and within the shield.

As is evident from the figures and text presented above, a variety of embodiments according to the present invention are contemplated.

An exemplary embodiment is an apparatus including a neutron scintillator, a first wavelength shifting fiber optic element and a second wavelength shifting fiber optic element. The first wavelength shifting fiber optic element is positioned in optical proximity to the neutron scintillator, and the second wavelength shifting fiber optic element positioned in optical proximity to the neutron scintillator and further positioned parallel to the first fiber optic element along at least a portion of the neutron scintillator. The apparatus includes a first photo-multiplication device optically coupled to the first fiber optic element, and a second photo-multiplication device optically coupled to the second fiber optic element. The apparatus further includes a controller structured to functionally execute certain operations of distinguishing a neutron radiation event from a gamma radiation event. In a further embodiment, the second fiber optic element is positioned within three fiber diameters of the first fiber optic element.

The controller interprets a first electronic signal from the first photo-multiplication device, and interprets a second electronic signal from the second photo-multiplication device. The controller distinguishes a neutron radiation event from a gamma radiation event in response to the first electronic signal and the second electronic signal.

An embodiment includes the neutron scintillator having a thickness between 0.5 and 1.0 mm, inclusive, where the first and second fiber optic elements are positioned on a first side of the neutron scintillator. The first and second fiber optic elements form a first layer of fiber optic elements on the first side of the neutron scintillator. The first layer of fiber optic elements may include additional fiber optic elements, where alternating fiber optic elements are optically coupled to distinct photo-multiplication devices.

A further embodiment includes the neutron scintillator having a second side with a second layer of fiber optic elements positioned in optical proximity to the second side. The second layer includes a third wavelength shifting fiber optic element, and a fourth wavelength shifting fiber optic element positioned parallel to the third fiber optic element along at least a portion of the neutron scintillator. Each of the third fiber optic element and the fourth fiber optic element are optically coupled to distinct photo-multiplication devices from each other. In one example, the third fiber optic element is optically coupled to the first photo-multiplication device and the fourth fiber optic element is optically coupled to the second photo-multiplication device. The second layer of fiber optic elements may include additional fiber optic elements, where alternating fiber optic elements are optically coupled to distinct photo-multiplication devices.

The controller distinguishes a neutron radiation event from a gamma radiation event in response to electronic signals from the distinct photo-multiplication devices, for example determining that a neutron radiation event has occurred in response to simultaneous light emissions from both of the first and second fiber optic elements, or simultaneous light emissions from both of the third and fourth fiber optic elements.

Another embodiment includes the neutron scintillator having a thickness between 1.0x and 2.0x, inclusive, wherein X is an optimal scintillator thickness. An exemplary optimal scintillator thickness is a thickness value between a maximum thickness value and a minimum thickness value. The maximum thickness value is a thickness value providing a greatest neutron absorption value at a minimum photon emission quantity threshold. The minimum thickness is a thickness value providing a greatest photon emission quantity at a minimum neutron absorption value threshold.

Another exemplary embodiment is a system including a neutron scintillator having a sheet of neutron absorptive material having a thickness greater than 1.0x and less than or equal to 2.0x, wherein X includes an optimal scintillator thickness. The neutron scintillator includes any material known in the art to absorb neutrons and release a photon cascade in response. Certain embodiments include a neutron scintillator having a high thickness value, and/or further include optical coverage of a high percentage of the neutron scintillator surface, allowing for neutron scintillator materials that may otherwise be considered marginal or insufficient. In certain non-limiting embodiments, the neutron scintillator is made from a material including $^6$Li, $^{10}$B, $^6$LiF:ZnS/Ag, ($^6$LiF:Y$_2$SiO$_5$:Ce), and/or a P47 phosphor.

The system includes a first layer of wavelength shifting fiber optic elements in optical proximity to the neutron scintillator on a first side of the neutron scintillator. Alternating fibers of the first layer are optically coupled to distinct photo-multiplication devices. The system includes a second layer of wavelength shifting fiber optic elements in optical proximity to the neutron scintillator on a second side of the neutron scintillator. Alternating fibers of the second layer are also optically coupled to distinct photo-multiplication devices.

The system further includes a controller that distinguishes a neutron radiation event from a gamma radiation event in response to electronic signals from the distinct photo-multiplication devices. In one embodiment, the controller determines the radiation event as a neutron radiation event in response to a simultaneous signal response from two of the distinct photo-multiplication devices that are optically coupled to adjacent fiber optic elements from one of the layers.

In a further embodiment, a first photo-multiplication device is optically coupled to a first set of fiber optic elements from the first layer (e.g. the odd fibers of the first layer), and to a second set of fiber optic elements from the second layer (e.g. the odd fibers of the second layer). A second photo-multiplication device is optically coupled to a third set of fiber optic elements from the first layer (e.g. the even fibers of the first layer), and to a second set of fiber optic elements from the second layer (e.g. the even fibers of the second layer). The controller further distinguishes a neutron radiation event from a gamma radiation event in response to a simultaneous signal response from each of the first and second photo-multiplication devices.

In certain embodiments, each of the alternating fiber optic elements is mirrored at an end of each fiber optic element, and the distinct photo-multiplication devices are optically coupled to the alternating fiber optic elements at an opposite end of each fiber optic element. A further embodiment includes the neutron detector having a housing defining the neutron scintillator, the alternating fibers, the distinct photo-multiplication devices, and the controller. The housing further includes a power input and a neutron reporting output. In certain embodiments, the neutron detector is a portable neutron detector weighing less than 35 kg (77 lbs.). In certain embodiments, the housing is formed from a moderating material, for example polyethylene, and is provided at a thickness sufficient to moderate neutrons that are above a thermal energy level.

The photo-multiplication devices may be any photo-multiplication device known in the art, including a photo-multiplier tube or a solid state photo-multiplier (e.g. a photomultiplier diode, etc.). A specific gain value for the photo-multiplication device cannot be specified, but the gain value for any particular application is dependent upon the application of the neutron detector (neutron flux, distance to the source, neutron detection percentage required, etc.), the type of scintillator utilized, the percentage of scintillated photons that are captured by the fiber optic elements, and the length and attenuation of the fiber optic elements.

Gain values provided by photo-multiplication tubes are commonly known to be sufficient for neutron detection. Where the neutron scintillator is a LiF:ZnS/Ag material, and where the wavelength shifting fibers are less than about 1 m in length, are positioned in close proximity to the scintillator (e.g. <0.1 mm), are positioned relatively close to each other (e.g. <2.1 mm center-to-center), a photomultiplier diode providing a gain as low as $10^6$ has been found to acceptably provide photo-multiplication for neutron indication even where a high percentage detection is desired for neutron events.

An exemplary system includes the neutron scintillator having one of $^6$Li, $^{10}$B, ($^6$LiF:Y$_2$SiO$_5$:Ce), and/or P47 phosphor, where the neutron scintillator has a thickness between 0.6 mm and 1.0 mm, inclusive. Another embodiment includes the neutron scintillator including $^6$LiF:ZnS/Ag, where the neutron scintillator has a thickness between 0.6 mm and 1.0 mm, inclusive.

An embodiment of the system includes a cylindrical shield defining a moderator positioned in proximity to the neutron scintillator. The cylindrical shield includes at least one open end, and includes a material that blocks neutrons from reaching the moderator except through the open end(s). An exemplary shield material includes gadolinium, although other neutron blocking materials are known and contemplated herein. A further exemplary system includes the moderator formed as a cylinder inside the cylindrical shield, where the neutron scintillator is formed to at least partially surround the moderator.

Another exemplary system includes a second neutron scintillator that is a sheet of neutron absorptive material having a thickness greater than 1.0× and less than or equal to 2.0×. The exemplary system further includes a third layer of wavelength shifting fiber optic elements in optical proximity to the second neutron scintillator on a first side of the second neutron scintillator, and a fourth layer of wavelength shifting fiber optic elements in optical proximity to the second neutron scintillator on a second side of the second neutron scintillator. Alternating fibers of the third layer are optically coupled to distinct photo-multiplication devices, and alternating fibers of the fourth layer are likewise optically coupled to distinct photo-multiplication devices.

Another exemplary embodiment is a method for detecting neutrons. An embodiment of the method utilizes a neutron detection platform that includes a neutron scintillator, a first wavelength shifting fiber optic element positioned in optical proximity to the neutron scintillator, and a second wavelength shifting fiber optic element positioned in optical proximity to the neutron scintillator and further positioned parallel to the first fiber optic element along at least a portion of the neutron scintillator. The neutron detection platform further includes a first photo-multiplication device that provides a first electronic signal and a second photo-multiplication device that provides a second electronic signal, with the first photo-multiplication device optically coupled to the first fiber optic element and with the second photo-multiplication device optically coupled to the second fiber optic element.

The method includes providing the neutron detection platform, interpreting the first electronic signal and the second electronic signal, and determining that a neutron radiation event has occurred in response to the first electronic signal and the second electronic signal simultaneously exceeding a first threshold amplitude deviation. An exemplary embodiment further includes determining that the neutron radiation event has occurred in response to the first electronic signal and the second electronic signal simultaneously exceeding the first threshold amplitude deviation for a second threshold amount of time. The second threshold amount of time may be any amount of time greater than 100 ns, greater than 200 ns, greater than 550 ns, and/or an amount of time long enough to provide confidence that a radiation event is not a gamma radiation event. An exemplary first threshold amplitude deviation is a deviation that is at least 10 times a noise level amplitude deviation, or a deviation that is at least 50 times a noise level amplitude deviation. The noise level amplitude deviation may be an averaged maximum noise deviation observed over a period of time, a specified noise level (e.g. entered as a calibration), and/or a maximum deviation observed at certain response frequencies or with certain signal filters applied to the first and second electronic signals.

An exemplary method further includes determining an optimal thickness for the neutron scintillator and providing the neutron scintillator having a thickness greater than the optimal thickness and less than twice the optimal thickness. The exemplary method further includes the provided neutron detection platform having the first and second fiber optic elements on a first side of the neutron scintillator. The neutron scintillator includes a second side having a third wavelength shifting fiber optic element and a fourth wavelength shifting fiber optic element positioned in optical proximity to the neutron scintillator on the second side of the neutron scintillator, where the fourth wavelength shifting fiber optic element is further positioned parallel to the third fiber optic element along at least a portion of the neutron scintillator.

Yet another exemplary embodiment is an apparatus having modules structured to functionally perform operations to distinguish a neutron radiation event from a gamma radiation event. The apparatus includes a photo detection module that interprets a first electronic signal provided by a first photo-multiplication device and interprets a second electronic signal provided by a second photo-multiplication device. The first photo-multiplication device is optically coupled to a first wavelength shifting fiber optic element positioned in optical proximity to a neutron scintillator. The second photo-multiplication device is optically coupled to a second wavelength shifting fiber optic element positioned in optical proximity to the neutron scintillator and further positioned parallel to the first fiber optic element along at least a portion of the neutron scintillator. The apparatus further includes a radiation discrimination module that determines that a neutron radiation event has occurred in response to the first electronic signal and the second electronic signal simultaneously exceeding a first threshold amplitude deviation. The apparatus further includes a neutron notification module that provides a neutron indication signal to an output device in response to the determining that the neutron radiation event has occurred.

In further embodiments, the radiation discrimination module further determines that a gamma radiation event has occurred in response to only one of the first electronic signal and the second electronic signal exceeding the first threshold amplitude deviation. An exemplary radiation discrimination module further determines the neutron radiation event has occurred in response to the first electronic signal and the second electronic signal simultaneously exceeding the first threshold amplitude deviation for a second threshold amount of time.

Yet another exemplary embodiment is a neutron detection system including a neutron scintillator having $^6$Li, $^{10}$B, ($^6$LiF:Y$_2$SiO$_5$:Ce), and/or P47 phosphor. The system further includes a number of wavelength shifting fiber optic elements positioned in optical proximity to the neutron scintillator, where adjacent fiber optic elements are optically coupled to distinct photo-multiplication devices. The system further includes means for distinguishing a neutron radiation event from a gamma radiation event.

Certain embodiments of the system include means for directional detection of the neutron radiation event. In certain embodiments the distinct photo-multiplication devices are solid-state photo sensors, for example photo multiplier diodes.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus, comprising:
a neutron scintillator;
a first set of wavelength shifting fiber optic elements positioned in optical proximity to an upper portion of the neutron scintillator, wherein said first set of wavelength shifting fiber optic elements includes at least a first wavelength shifting fiber optic element and a second wavelength shifting fiber optic element, wherein said first and second wavelength shifting fiber optic elements are positioned generally parallel to one another;
a second set of wavelength shifting fiber optic elements positioned in optical proximity to a lower portion of the neutron scintillator, wherein said second set of wavelength shifting fiber optic elements includes at least a third wavelength shifting fiber optic element and a fourth wavelength shifting fiber optic element, wherein said third and fourth wavelength shifting fiber optic elements are positioned generally parallel to one another;
a first photo-multiplication device optically coupled to the first wavelength shifting fiber optic element and said third wavelength shifting fiber optic element;
a second photo-multiplication device optically coupled to the second wavelength shifting fiber optic element and the fourth wavelength shifting fiber optic element; and
a controller structured to:
interpret a first electronic signal from the first photo-multiplication device;
interpret a second electronic signal from the second photo-multiplication device; and
distinguish a neutron radiation event from a gamma radiation event in response to the first electronic signal and the second electronic signal.

2. The apparatus of claim 1, wherein the first wavelength shifting fiber optic element is positioned within three fiber diameters of the second wavelength shifting fiber optic element.

3. The apparatus of claim 1, further comprising: the neutron scintillator having a thickness between 0.5 and 1.0 mm.

4. The apparatus of claim 1, further comprising: the neutron scintillator having a thickness between 1.0× and 2.0×, inclusive, wherein X comprises an optimal scintillator thickness.

5. The apparatus of claim 4, wherein the optimal scintillator thickness comprises a thickness value between: a maximum thickness value comprising a thickness value providing a greatest neutron absorption value at a minimum photon emission quantity threshold; and a minimum thickness comprising a thickness value providing a greatest photon emission quantity at a minimum neutron absorption value threshold.

6. A system, comprising:
a neutron scintillator comprising a sheet of neutron absorptive material having a thickness greater than 1.0×, wherein X comprises an optimal scintillator thickness;
a first layer of a plurality of wavelength shifting fiber optic elements in optical proximity to the neutron scintillator on a first side of the neutron scintillator, wherein alternating fibers of the first layer are optically coupled to distinct photo-multiplication devices, wherein each wavelength shifting fiber optic element in the first layer of a plurality of wavelength shifting fiber optic elements are generally adjacent to one another and parallel to one another;
a second layer of a plurality of wavelength shifting fiber optic elements in optical proximity to the neutron scintillator on a second side of the neutron scintillator, wherein alternating fibers of the second layer are optically coupled to distinct photo-multiplication devices, wherein each wavelength shifting fiber optic element in the second layer of a plurality of wavelength shifting fiber optic elements are generally adjacent to one another and parallel to one another; and
a controller structured to distinguish a neutron radiation event from a gamma radiation event in response to electronic signals from the distinct photo-multiplication devices.

7. The system of claim 6, wherein the neutron scintillator further comprises a thickness less than or equal to 2.0×.

8. The system of claim 7, further comprising a second neutron scintillator comprising a sheet of neutron absorptive material having a thickness greater than 1.0× and less than or equal to 2.0×; a third layer of wavelength shifting fiber optic elements in optical proximity to the second neutron scintillator on a first side of the second neutron scintillator, wherein alternating fibers of the third layer are optically coupled to distinct photo-multiplication devices; and a fourth layer of wavelength shifting fiber optic elements in optical proximity to the second neutron scintillator on a second side of the second neutron scintillator, wherein alternating fibers of the fourth layer are optically coupled to distinct photo-multiplication devices.

9. The system of claim 6, wherein a first set of the alternating fibers from the first layer and a second set of the alternating fibers from the second layer are optically coupled to a first one of the distinct photo-multiplication devices, and wherein a third set of the alternating fibers from the first layer and a fourth set of the alternating fibers from the second layer are optically coupled to a second one of the distinct photo-multiplication devices.

10. The system of claim 9, wherein the controller is further structured to determine a radiation event as a neutron radiation event in response to a simultaneous signal response from each of the distinct photo-multiplication devices.

11. The system of claim 6, wherein each of the alternating fibers are mirrored at an end of each fiber, and wherein each of the distinct photo-multiplication devices are optically coupled to the alternating fibers at an opposite end of each fiber.

12. The system of claim 11, further comprising a neutron detector having a housing defining the neutron scintillator, the alternating fibers, the distinct photo-multiplication devices, and the controller, the housing further comprising a power input and a neutron reporting output.

13. The system of claim 12, wherein the neutron detector is a portable neutron detector weighing less than 35 kg (77 lbs.).

14. The system of claim 13, wherein the neutron scintillator comprises one of $^6$Li and $^{10}$B, and wherein the neutron scintillator has a thickness between 0.6 mm and 1.0 mm, inclusive.

15. The system of claim 13, wherein the neutron scintillator comprises one of $^6$Li and $^{10}$B, and wherein the neutron scintillator has a thickness greater than 0.6 mm.

16. The system of claim 13, wherein the neutron scintillator comprises $^6$LiF:ZnS/Ag, and wherein the neutron scintillator has a thickness between 0.6 mm and 1.0 mm, inclusive.

17. The system of claim 13, wherein the neutron scintillator comprises one of a P47 phosphor and ($^6$LiF:Y$_2$SiO$_5$:Ce).

18. The system of claim 13, wherein the housing comprises a polyethylene moderator.

19. The system of claim 13 wherein each of the distinct photo-multiplication devices comprise a photomultiplier diode.

20. The system of claim 6, further comprising a cylindrical shield defining a moderator positioned in proximity to the neutron scintillator, the cylindrical shield having an open end and comprising a material that blocks neutrons from reaching the moderator except through the open end.

21. The system of claim 20, wherein the cylindrical shield comprises at least one neutron absorbing material selected from the neutron absorbing materials consisting of gadolinium, boron, and lithium.

22. The system of claim 20, further comprising the moderator formed as a cylinder disposed in the cylindrical shield, and wherein the neutron scintillator at least partially surrounds the moderator.

23. A method, comprising:
providing a neutron detection platform comprising a neutron scintillator, a first wavelength shifting fiber optic element positioned in optical proximity to the neutron scintillator, a second wavelength shifting fiber optic element positioned in optical proximity to the neutron scintillator and further positioned parallel to and in optical proximity to the first fiber optic element along at least a portion of the neutron scintillator, a first photo-multiplication device that provides a first electronic signal and a second photo-multiplication device that provides a second electronic signal, the first photo-multiplication device optically coupled to the first fiber optic element and the second photo-multiplication device optically coupled to the second fiber optic element;
interpreting the first electronic signal and the second electronic signal; and
determining that a neutron radiation event has occurred in response to the first electronic signal and the second electronic signal simultaneously exceeding a first threshold amplitude deviation.

24. The method of claim 23, wherein the determining is further in response to the first electronic signal and the second electronic signal simultaneously exceeding the first threshold amplitude deviation for a second threshold amount of time.

25. The method of claim 24, wherein the second threshold amount of time comprises 100 nano-seconds.

26. The method of claim 24, wherein the second threshold amount of time comprises 200 nano-seconds.

27. The method of claim 24, wherein the second threshold amount of time comprises 550 nano-seconds.

28. The method of claim 23, wherein the first threshold amplitude deviation is at least 10 times a noise level amplitude deviation.

29. The method of claim 23, further comprising determining an optimal thickness for the neutron scintillator, wherein the providing further comprises providing the first and second fiber optic elements on a first side of the neutron scintillator, providing the neutron scintillator having a thickness greater than the optimal thickness and less than twice the optimal thickness, the method further comprising providing a third wavelength shifting fiber optic element positioned in optical proximity to the neutron scintillator on a second side of the neutron scintillator and a fourth wavelength shifting fiber optic element positioned in optical proximity to the neutron scintillator and further positioned parallel to and in optical proximity to the third fiber optic element along at least a portion of the neutron scintillator.

30. An apparatus, comprising:
a photo detection module structured to interpret a first electronic signal provided by a first photo-multiplication device optically coupled to a first wavelength shifting fiber optic element positioned in optical proximity to a neutron scintillator and to interpret a second electronic signal provided by a second photo-multiplication device optically coupled to a second wavelength shifting fiber optic element positioned in optical proximity to the neutron scintillator and further positioned parallel to and in optical proximity to the first fiber optic element along at least a portion of the neutron scintillator;
a radiation discrimination module structured to determine that a neutron radiation event has occurred in response to the first electronic signal and the second electronic signal simultaneously exceeding a first threshold amplitude deviation; and
a neutron notification module structured to provide a neutron indication signal to an output device in response to the determining that the neutron radiation event has occurred.

31. The apparatus of claim 30, wherein the radiation discrimination module is further structured to determine that a gamma radiation event has occurred in response to only one of the first electronic signal and the second electronic signal exceeding the first threshold amplitude deviation.

32. The apparatus of claim 30, wherein the radiation discrimination module is further structured to determine the neutron radiation event has occurred in response to the first electronic signal and the second electronic signal simultaneously exceeding the first threshold amplitude deviation for a second threshold amount of time.

33. A neutron detection system, comprising:
a neutron scintillator comprising at least one neutron absorption material;
a first plurality of wavelength shifting fiber optic elements positioned in optical proximity to an upper portion of the neutron scintillator, wherein adjacent fiber optic elements of said first plurality of wavelength shifting fiber optic elements are optically coupled to distinct photo-multiplication devices;
a second plurality of wavelength shifting fiber optic elements positioned in optical proximity to a lower portion of the neutron scintillator, wherein adjacent fiber optic elements of said second plurality of wavelength shifting fiber optic elements are optically coupled to distinct photo-multiplication devices; and
means for distinguishing a neutron radiation event from a gamma radiation event.

34. The neutron detection system of claim 33, wherein the at least one neutron absorption material comprises a material selected from the materials consisting of $^6$Li, $^{10}$B, P47 phosphor, and ($^6$LiF:Y$_2$SiO$_5$:Ce).

35. The neutron detection system of claim 33, further comprising means for directional detection of the neutron radiation event.

36. The neutron detection system of claim 33, wherein the distinct photo-multiplication devices comprise photomultiplier diodes.

37. The neutron detection system of claim 36, wherein a ratio of wavelength shifting fiber optic elements to distinct photo-multiplication devices comprises 9:1.

38. The neutron detection system of claim 36, wherein a ratio of wavelength shifting fiber optic elements to distinct photo-multiplication devices comprises a value between 1:1 and 9:1, inclusive.

39. The neutron detection system of claim 33, wherein a ratio of wavelength shifting fiber optic elements to distinct photo-multiplication devices comprises a value between 2:1 and 40:1, inclusive.

40. The neutron detection system of claim 33, wherein a ratio of wavelength shifting fiber optic elements to distinct photo-multiplication devices comprises a value between 9:1 and 100:1, inclusive.

41. The neutron detection system of claim 33, further comprising a second neutron scintillator comprising at least one neutron absorption material; a second plurality of wavelength shifting fiber optic elements positioned in optical proximity to the second neutron scintillator, wherein adjacent fiber optic elements are optically coupled to distinct photo-multiplication devices; and wherein at least a portion of the first neutron scintillator and the second neutron scintillator comprise one of parallel planes and parallel curviplanar structures.

* * * * *